Patented May 29, 1928.

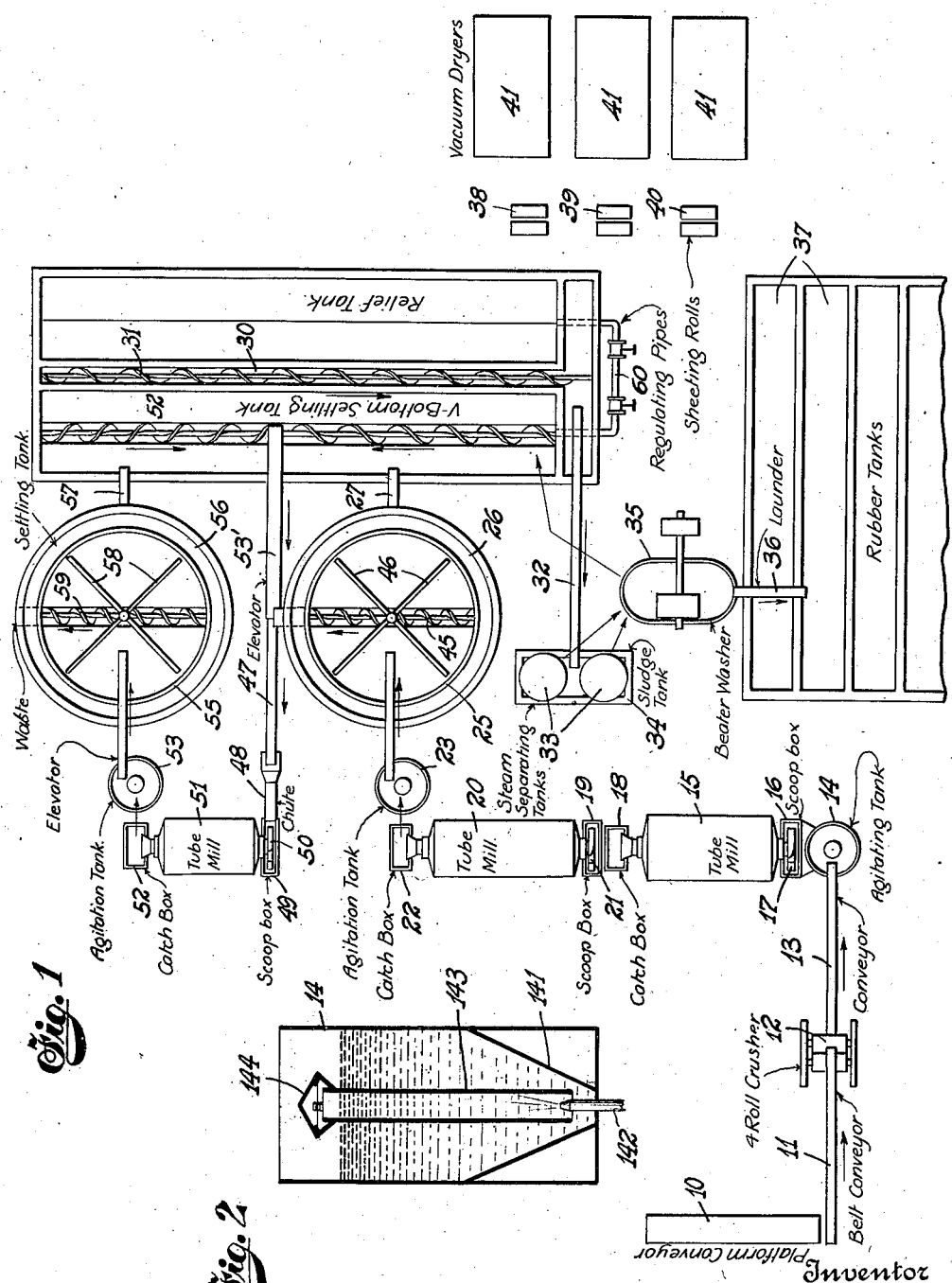

1,671,570

UNITED STATES PATENT OFFICE.

GEORGE H. CARNAHAN, OF LONG BEACH, CALIFORNIA, ASSIGNOR TO INTERCONTINENTAL RUBBER PRODUCTS CORPORATION, OF WILMINGTON, DELAWARE, A CORPORATION OF DELAWARE.

METHOD OF AND APPARATUS FOR TREATING GUMLIKE SUBSTANCES.

Application filed June 4, 1923. Serial No. 643,147.

This invention relates to rubber and has for its more general objects to provide novel processes or methods of separating the rubber from its vegetable source, novel processes or methods of treating the rubber, novel combinations and sub-combinations of instrumentalities to carry the processes into practice, and to novel forms of rubber produced by such processes or methods. Other objects and advantages will appear as the invention is hereinafter disclosed.

While the invention, or at least certain features thereof, may be applied to other rubber or gum-like materials, it is particularly adapted for the removal of rubber from the guayule plant or shrub and for the treatment of the rubber after such removal. For this reason, and to avoid surplusage in disclosure, I shall restrict the present disclosure to the removal of rubber from guayule shrubs and to the treatment of such rubber. The processes or methods may best be explained in conjunction with what I now consider preferred forms and combinations of instrumentalities for carrying them into practice. I shall therefore adopt that plan of disclosure and shall refer to the drawings in which I have indicated, somewhat diagrammatically, in Fig. 1, the plan layout of a preferred form of plant or mill, and in Fig. 2 a vertical section of one of the agitators.

For a proper understanding of the invention I shall first briefly and generally describe the guayule plant. It is an herbaceous perennial, native of Texas and Mexico, contains resin, caoutchouc, essential oil and other materials and may be employed to produce guayule rubber.

The guayule shrubs are deposited upon or fed to a platform conveyer 10, then fed to and automatically carried by a belt conveyer 11 from the platform conveyer and discharged into the inlet of a four-roller crusher 12. The shrubs are broken up into fragments in the crusher 12 and then discharged from the bottom of the crusher upon a bucket conveyer 13 which automatically carries the crushed material to an agitator 14. Preferably, the material is sprayed with water at the crusher to settle any dust tending to rise therefrom and to wet the material and make it more susceptible to the treatments hereinafter described. Sufficient additional water is added to the material either at the crusher 12, or at the agitator 14, preferably the latter, to provide a mixture of 3–4.5, preferably 3.5, parts by weight of water to one part of guayule material, to be fed to the tube mill 15. The water and guayule material are violently agitated in the agitator 14 by means of an upwardly directed air blast entering the bottom of the latter. The agitator 14 (see Fig. 2) is preferably provided with a bottom in the form of an inverted cone 141, through the bottom or apex of which an air jet 142 is played through a central tube 143 which is open at its lower end to the interior of the tank 14 and which discharges at its open upper end against a hood or cap 144. By virtue of these provisions, a violent agitating and scrubbing effect is secured in the agitator 14. The volume of the agitator 14 is preferably designed to maintain a soaking period of about one-half hour. The mixture of water and material is automatically discharged from the agitator 14 into the scoop box 16 of the tube mill 15 which is provided with a scoop 17 for automatically scooping up the mixture in the scoop box and feeding it into the inlet trunnion of the mill 15. The mill 15 is continuously rotated about its longitudinal axis and contains a multiplicity of grinding elements, preferably in the form of flint or Danish pebbles having a diameter of from 3.5 to 4.0 inches. The mill 15 is designed primarily for grinding or disintegrating the guayule material. The material is subjected to the abrasive, crushing and disintegrating action of the pebbles within the mill 15 and is separated into three components; i. e., rubber, bagasse, and lighter material generally known as cork. The rubber and cork are lighter than water while the bagasse, when waterlogged, is heavier than water. The grinding media serve also to clean the rubber by their rubbing contact therewith and also, to a certain extent, to agglomerate the particles of rubber. The mill 15 discharges into a pebble or catch box 18 which catches and retains any pebbles accidentally discharged from the mill. The guayule material and water, discharged from the mill 15 into the box 18, is discharged from the latter into the scoop box 19 of the tube mill 20 which is provided with a scoop 21 for causing the mixture automatically to enter the inlet trunnion of the said mill 20. Water is added to the mixture, preferably in the pebble box 18, to bring the ratio of water to guayule mixture up to from 6-8 to 1, preferably 7 to 1. The mill 20 contains grinding media preferably in the form of flint or Danish pebbles having an average diameter of 3 inches. In the mill 20 the action upon the material is primarily to agglomerate the particles of rubber, although there will be a certain amount of disintegrating and cleaning action as set forth in connection with the mill 15.

By treating guayule material in a grinding or disintegrating mill in the presence of water, two extremely important functions, among others, are performed. The material is disintegrated and the rubber, cork and bagasse thereby separated from each other. The rubber particles are agglomerated. The disintegrating or grinding action is accomplished most efficiently in the presence of a comparatively low amount of water while the agglomerating action is accomplished most efficiently in the presence of a comparatively high amount of water. The importance and advantageous results incident to treating the material in the mill 15 in the presence of a comparatively low amount of water and preferably with comparatively large grinding media, and in the mill 20 in the presence of a comparatively high amount of water and preferably with smaller grinding media, will therefore be appreciated.

The material discharges from the mill 20 into a pebble box 22 which catches and retains any pebbles accidentally discharged from the mill 20. The mixture discharged from the mill 20 consists of water, worms of rubber, each about the size of a grain of wheat, cork and bagasse. This mixture is discharged from the box 22 into a scrubber or agitator 23, (similar to the agitator 14), where it is subjected to a violent agitation and scrubbing by the stream of air under pressure which enters the bottom of the agitator and is directed toward the upper part thereof as previously described. In its passage from the mill 20 to the agitator 23, water is added to the mixture, preferably in the box 22, to bring the ratio of water to guayule material up to about 12 to 1. The mixture is automatically elevated from the agitator 23 to a settling tank 25. By the time the mixture reaches the tank 25 the guayule material will not only have been substantially separated into three components—rubber, cork, and bagasse—but the bagasse will have become water-logged or impregnated with water to such an extent that it will sink in water. Therefore, in the settling tank 25, the lighter particles of the material; i. e., the rubber and the cork, rise to the surface of the water and the bagasse settles or sinks to the bottom. The rubber and cork particles overflow from the tank 25 into the launder 26, whence it flows by gravity down the trough 27 into a V-bottom settling tank 28. A settling tank 29 is shown arranged parallel to the tank 28 and has for its function to provide an auxiliary or relief tank for the tank 28. The design is such as to allow sufficient time to enable substantially all rubber particles to rise to the surface of the water whence they are skimmed by hand, together with cork particles, into a trough 30 placed between said tanks 28 and 29. A screw-conveyor 31 runs in this trough 30 and carries the rubber and cork to the foot of the elevator 32, where it is automatically picked up, carried up by the elevator 32 and deposited into a bin above the heating and compression tanks 33, 33. Sufficient alkali, such as milk of lime, is preferably added to the mixture in the tanks 33, 33, to make the rubber harsh and to fix the resin in the rubber, which is naturally acid.

The mixture of water, rubber and cork is permitted to flow from the bin above the said tanks 33, 33, into one or the other of the said tanks to charge the same. After the tank 33 is charged, steam is injected into it to bring the water to boiling temperature. The contents of the tank are then subjected to hydraulic pressure of about 250 pounds for a sufficient period—say 1.5 hours—to waterlog or impregnate the cork with water to such an extent as to cause it to sink. Among other functions, the heating of the mixture in the compression tanks softens the fibres of the cork and thus aids in the waterlogging thereof. The heating also sterilizes the mixture and kills, or renders inert, the enzymes and any bacteria which might otherwise give rise to subsequent fermentation.

After the charge of each tank 33 is treated as set forth above, it is discharged into a reservoir 34 which discharges into a beater washer 35 where the mixture is given a mechanical scrubbing action which thoroughly separates the rubber from the cork particles. The rubber particles rise to the surface while the cork particles, which became waterlogged in the tanks 33, 33, sink or settle to the bottom. The rubber particles are drawn off the top of the washer 35 and flow down the launder 36 into the storage tanks 37. The waterlogged cork particles are passed from the bottom of the washer 35 to the tank 28.

The rubber is skimmed from the surface of the storage tanks 37 and subjected to the action of a series of washing rolls 38, 39, 40, which clean, agglomerate it and roll it into sheets. These sheets are then placed on trays and placed in one or another of the vacuum driers 41. When a vacuum drier 41 has received its charge it is supplied with steam at about 20 pounds pressure. Then the drier is subjected to a vacuum of about 28.0 inches causing water and essential oil vapors to pass off from the rubber. These vapors are passed through a condenser and the essential oil—a commercially useful liquid—collected.

It will be noted that I remove the essential oil from the rubber before it has had any sufficient time to dissolve the resin and to cause oxidation or otherwise to cause deterioration of the rubber. In other words, the time interval which elapses between the crushing of any particular portion of guayule shrub, in the crusher 12, and the removal of the essential oil from the rubber, in the drier 41, is comparatively short and of no sufficient duration as to permit the essential oil to depreciate the rubber. This is an important feature of my invention. Prior to crushing in the machine 12 the resin, caoutchouc, and essential oil, are in separate cells or substantially out of contact with each other. By the crushing action in the machine 12 the cells are broken down and it therefore becomes important to remove the essential oil from the rubber before any long time has elapsed. This is accomplished by my apparatus and process.

After the above described treatment in the drier or driers 41 the sheets of rubber are removed and pressed into blocks or other suitable shapes for shipment.

In order to remove any particles of rubber that adhere to the bagasse, which settles in the tank 25 as heretofore described, and any particles of rubber that adhere to the waterlogged cork which sinks in the tank 28, I prefer to employ the following method and apparatus.

The tank 25 is provided at its bottom with a trough containing a screw conveyer 45 and with a plurality of vanes or scrapers 46, rotated by any suitable means, for feeding the waterlogged bagasse into the conveyer trough. The conveyer 45 automatically conveys and discharges the bagasse into the bottom of the elevator 47 which discharges the bagasse into a chute 48 and thence into a scoop box 49. The V-bottom of the tank 28 terminates in a trough containing a pair of screw conveyers 52, 52, which feed the waterlogged cork toward the center of the bottom of the tank 28 and into an elevator 53 which discharges the waterlogged cork into the elevator 47. The waterlogged cork passes, along with the bagasse in the elevator 47, into the chute 48 and then into the scoop box 49. If necessary, water is added to the bagasse, preferably in the scoop box 49 to form a mixture of about six parts by weight of water to one part of the other material. The mixture is automatically picked up by the scoop 50, forming a part of the tube mill 51, and automatically fed through the inlet trunnion of the latter. The tube mill 51 contains grinding media, preferably in the form of flint or Danish pebbles each about 2.5 inches in diameter, and is rotated about its longitudinal axis. The action of the tube mill 51 upon the material (bagasse, cork and any particles of rubber not previously removed) will be understood in view of the foregoing description of the tube mills 15 and 20. Among other functions accomplished by the tube mill 51, to a greater or less degree, are the grinding, rubber-agglomerating, rubber-scrubbing, bagasse-waterlogging, actions heretofore described.

The mixture of material is automatically discharged from the outlet trunnion of the tube mill 51 into a pebble or catch box 52, which catches and retains any pebbles discharged from the mill 51. The material passes from the box 52 to the agitating tank 53, thence to elevator 54 and into the settling tank 55. The floating particles of rubber and cork over-flow the upper edge of the tank 55 into a launder 56 and enter the tank 28 through a trough or chute 57. The waterlogged bagasse and waterlogged cork sink or settle in the tank 55 and are automatically removed therefrom, as waste material, by means of the rotating vanes 58 and screw conveyer 59 at the lower part of the tank. The rubber and cork particles, which enter the tank 28 through the trough or chute 57, are passed into the conveyer 31 and then subsequently treated as described at length above in connection with the rubber and cork particles which enter the tank 28 from the tank 25. The instrumentalities 52 to 59, inclusive, correspond respectively to the elements 22, 23, 24, 25, 26, 27, 46 and 48 heretofore described, and therefore require no further description. Water is preferably added to the mixture in the box 52 to cause the ratio of water to the other material to be about 12 to 1. The relief of the settling tank 28 into the tank 29 may be accomplished by means of regulating pipe or conduit connections 60.

The waterlogged bagasse and waterlogged cork, discharged from the conveyer 59, were referred to above as waste material. In a sense this material is not wasted since I propose to dry it to a sufficient extent and to employ it as fuel to feed a boiler or battery of boilers (not shown) to supply steam to the engines, or preferably single engine (not shown), employed to drive the crusher 12, tube mills 15, 20, 51, the various conveyers and elevators, and other moving parts of the plant. The methods and apparatus above described are so efficient that the so-called waste material discharged from the conveyer 59 constitutes the sole supply of fuel for operating all of the machinery employed. This is an exceedingly important advantage since a considerable saving in operating expenses is effected and the plant may be advantageously located at the region where the guayule scrubs grow or are grown.

In addition to other advantages, now apparent to those skilled in the art in view of the foregoing disclosure, I wish to stress the following: By virtue of my invention the time required to extract the rubber from the guayule shrubs and to place it in condition to be shipped is greatly reduced. Furthermore, the product produced is a far better product than has heretofore been produced. When Mexican guayule shrubs are employed as the raw material, the product-guayule rubber—produced by my complete process contains about 20% resin, 78% pure caoutchouc, and substantially no essential oil. Moreover, the essential oil is removed from the product before deterioration, otherwise incident to its prolonged presence, has taken place.

In accordance with the provisions of the patent statutes, I have herein described the principles of operation of my invention, together with the apparatus which I now consider to represent the best embodiments thereof, but I desire to have it understood that the apparatus disclosed is only illustrative and that the invention or certain features thereof may be carried out by other means. Also, while it is designed to use the various features and elements in the combination described, some of these may be altered and others omitted without interfering with some of the results and advantages outlined, and the invention extends to such use.

What I claim is—

1. The process of producing rubber from a vegetable source which comprises grinding the source in successive stages in the presence of water, the ratio of water to material in one stage being different from that in another stage.

2. The process of producing rubber from a vegetable source which comprises subjecting the source to the action of a multiplicity of freely moving elements in the presence of water to grind the source, and subjecting the source so treated to the action of a multiplicity of freely moving elements in the presence of a larger ratio of water to agglomerate particles of the rubber.

3. The process of producing rubber from a vegetable source which comprises finely dividing the source, grinding the source in the presence of a suitable quantity of water, and subjecting the source to the rubbing action of a multiplicity of freely and individually moving relatively hard elements in the presence of a larger quantity of water.

4. The process of producing rubber from a vegetable source which comprises agitating the source in the presence of water preliminary to grinding, grinding the source in the presence of a suitable quantity of water, and subjecting the source to the rubbing action of a multiplicity of freely and individually moving relatively hard elements in the presence of a larger quantity of water.

5. The process of producing rubber from a vegetable source which comprises finely dividing the source, agitating the source in the presence of water preliminary to grinding, grinding the source in the presence of a suitable quantity of water, and subjecting the source to the rubbing action of a multiplicity of freely and individually moving relatively hard elements in the presence of a larger quantity of water.

6. The process of producing rubber from a vegetable source which comprises finely dividing the source, grinding the source in the presence of a suitable quantity of water, subjecting the source to the rubbing action of a multiplicity of freely and individually moving relatively hard elements in the presence of a larger quantity of water, separating the rubber and particles of the source which are lighter than water from the portions of the source which are heavier than water by flotation of the former, and subjecting the rubber to the action of a suitable alkali.

7. The process of producing rubber from a vegetable source which comprises finely dividing the source, grinding the source in the presence of a suitable quantity of water, subjecting the source to the rubbing action of a multiplicity of freely and individually moving relatively hard elements in the presence of a larger quantity of water, separating the rubber and particles of the source which are lighter than water from the portions of the source which are heavier than water by flotation of the former, heating the rubber and particles which are lighter than water, subjecting the rubber and particles which are lighter than water to water under pressure to cause the last mentioned particles to become heavier than water, and separating the rubber from the remaining particles by scrubbing and flotation.

8. The process of producing rubber from a vegetable source which comprises grinding the source in the presence of a suitable quantity of water, subjecting the source to the rubbing action of a multiplicity of freely and individually moving relatively hard elements in the presence of a larger quantity of water, separating the rubber and particles of the source which are lighter than water from the portions of the source which are heavier than water by flotation of the former, separating out the rubber, and removing essential oil from the rubber by distillation.

9. The process of producing rubber from a vegetable source which comprises finely dividing the source, agitating the source in the presence of water preliminary to grinding, grinding the source in the presence of a suitable quantity of water, subjecting the source to the rubbing action of a multiplicity of freely and individually moving relatively hard elements in the presence of a larger quantity of water, agitating the source in the presence of water, separating the rubber and particles of the source which are lighter than water from the portions of the source which are heavier than water by flotation of the former, subjecting the rubber to the action of a suitable alkali, heating the rubber and particles which are lighter than water, subjecting the rubber and particles which are lighter than water to water under pressure to cause the last mentioned particles to become heavier than water, separating the rubber from the remaining particles by scrubbing and flotation, and rolling the rubber into sheets.

10. The process of producing rubber from a vegetable source which comprises finely dividing the source, agitating the source in the presence of water preliminary to grinding, grinding the sources in the presence of a suitable quantity of water, subjecting the source to the rubbing action of a multiplicity of freely and individually moving relatively hard elements in the presence of a larger quantity of water, agitating the source in the presence of water, separating the rubber and particles of the source which are lighter than water from the portions of the source which are heavier than water by flotation of the former, subjecting the rubber to the action of a suitable alkali, heating the rubber and particles which are lighter than water, subjecting the rubber and particles which are lighter than water to water under pressure to cause the last mentioned particles to become heavier than water, separating the rubber from the remaining particles by scrubbing and flotation, rolling the rubber into sheets, removing essential oil from the rubber by distillation, regrinding the above mentioned heavier-than-water material of the source, agitating the last mentioned material in the presence of water, separating the rubber and particles lighter than water from the last mentioned material by flotation, and subsequently treating the last mentioned mixture of rubber and particles lighter than water to substantially the same treatment set forth above in connection with the first mentioned mixture of rubber and particles lighter than water separated from the source.

11. The process of treating guayule rubber which comprises subjecting the rubber to a solution of milk of lime.

12. The process of treating guayule rubber which comprises subjecting the rubber to a solution of milk of lime, and subsequently scrubbing the rubber.

13. The method of extracting rubber from its vegetable source which comprises passing the source through a tube mill in the presence of water, increasing the ratio of water to source, and passing the mixture through a second tube mill.

14. A plant for extracting rubber from its vegetable source and comprising in combination, a tube mill, means for feeding crushed source and water to said tube mill while the latter is rotating, a second tube mill into which said first mentioned tube mill discharges indirectly, means for changing the volume of water intermediate said mills, and means preventing the passage of water directly from either mill to the other.

15. A plant for extracting rubber from its vegetable source and comprising in combination, a tube mill, means for feeding crushed source and water to said tube mill while the latter is rotating, a second tube mill into which said first mentioned tube mill discharges indirectly, means for changing the volume of water intermediate said mills, means preventing the passage of water directly from either mill to the other, and grinding media in said tube mills, the grinding media in the first mill being of larger size than the media in the second mill.

16. A plant for extracting rubber from its vegetable source and comprising in combination, a tube mill, means for feeding a mixture of water and source to said tube mill while the latter is rotating, a settling tank which receives the discharge of said tube mill, a second tube mill, and means for supplying the material which settles to the bottom of said tank, to said second mentioned tube mill.

17. A plant for extracting rubber from its vegetable source and comprising in combination, a tube mill, means for feeding a mixture of water and source to said tube mill while the latter is rotating, a second tube mill into which said first mentioned tube mill discharges, a settling tank which receives the discharge of said second tube mill, a third tube mill, and means for supplying the material which settles to the bottom of said tank, to said third tube mill.

18. The process of treating guayule rubber which comprises subjecting the rubber to lime.

In testimony whereof I hereto affix my signature.

GEORGE H. CARNAHAN.